(12) United States Patent
Mihaylov et al.

(10) Patent No.: US 11,163,144 B2
(45) Date of Patent: Nov. 2, 2021

(54) FOCUSING OF OPTICAL DEVICES

(71) Applicant: APPLEJACK 199 L.P., Milpitas, CA (US)

(72) Inventors: Mihail Mihaylov, San Jose, CA (US); Wojciech J Walecki, Sunrise, FL (US); Jae Ryu, Campbell, CA (US)

(73) Assignee: APPLEJACK 199 L.P., Milpitas, CA (US)

( * ) Notice: Subject to any disclaimer, the term of this patent is extended or adjusted under 35 U.S.C. 154(b) by 0 days.

(21) Appl. No.: 17/147,393

(22) Filed: Jan. 12, 2021

(65) Prior Publication Data

US 2021/0132355 A1    May 6, 2021

Related U.S. Application Data

(63) Continuation of application No. 16/573,923, filed on Sep. 17, 2019, now Pat. No. 10,935,777, which is a continuation of application No. 15/786,911, filed on Oct. 18, 2017, now Pat. No. 10,416,430.

(60) Provisional application No. 62/504,395, filed on May 10, 2017.

(51) Int. Cl.
   *G02B 21/06*    (2006.01)
   *H04N 5/225*    (2006.01)
   *G02B 21/36*    (2006.01)
   *G02B 21/08*    (2006.01)
   *H04N 5/372*    (2011.01)

(52) U.S. Cl.
   CPC .......... *G02B 21/06* (2013.01); *G02B 21/082* (2013.01); *G02B 21/365* (2013.01); *H04N 5/2256* (2013.01); *H04N 5/372* (2013.01)

(58) Field of Classification Search
   None
   See application file for complete search history.

(56) References Cited

U.S. PATENT DOCUMENTS

| | | | |
|---|---|---|---|
| 5,150,146 A * | 9/1992 | Ueda | G02B 7/32 396/104 |
| 10,416,430 B2 | 9/2019 | Walecki et al. | |
| 2009/0244482 A1* | 10/2009 | Elsner | A61B 3/1025 351/206 |
| 2012/0097835 A1* | 4/2012 | Sharonov | G01B 11/026 250/201.3 |

(Continued)

*Primary Examiner* — James M Hannett
(74) *Attorney, Agent, or Firm* — Maschoff Brennan

(57) ABSTRACT

The present subject matter includes a method of focusing of an optical imaging apparatus. The method comprises causing illumination of an object using an illuminating beam to thereby cause generation of a scattered beam. A first set of luminous parameters are derived from a first detected position of a luminous representation formed by the scattered beam from the object. The illumination-beam is focused upon the object by triggering a movement of the object along an optical-axis in a first direction, the first direction being based a numerical-representation of the first set of luminous parameters. A second set of luminous parameters are derived from a second detected position of the luminous-representation of the object, the second detected position being related to the first detected position and the movement of the object. The focusing of the illumination beam is ceased based at-least on a numerical-representation of the second set of luminous parameters.

20 Claims, 15 Drawing Sheets

(56) References Cited

U.S. PATENT DOCUMENTS

2018/0276843 A1\* 9/2018 Send .................... G01C 3/08
2018/0329192 A1 11/2018 Walecki et al.

\* cited by examiner

FOCUSING OF OPTICAL DEVICES

CROSS REFERENCE TO RELATED APPLICATION

This application claims priority to U.S. application Ser. No. 16/573,923 filed Sep. 17, 2019, which claims priority to U.S. application Ser. No. 15/786,911, filed Oct. 18, 2017, which claims the benefit of U.S. Provisional Application No. 62/504,395, filed May 10, 2017, the disclosures of each of which are hereby incorporated herein by reference in their entireties.

FIELD

The present subject matter relates to focusing of optical-devices.

BACKGROUND

An imaging digital microscope employing an infinity corrected microscope objective lens usually produces a blurred image when the object is placed outside the focal plane of the objective lens. In order to produce a sharp image, one can vary the distance between the object and objective lens until the desired sharp image is produced.

A lot of existing algorithms enabling automation of such a procedure involve optimization of a predefined merit-function, with respect to an image recorded by an array-detector of the microscope, as based on the distance between the object and the detector. Such methods depend on formation of a distinguishable image and prove effective only over an extremely limited range in the close proximity of the optimal position. When the object is placed far away from the focal plane (at the distance much larger than the depth of focus distance from the focal plane of the objective), the image is blurred so much that the merit functions (or focus functions) used for focusing vary so slowly that it is difficult to detect whether the distance between the object and the objective lens should be increased or decreased in order to achieve focusing. In practical implementation, the changes of focus function when far away from the focal plane may become buried in measurement noise.

SUMMARY

This summary is provided to introduce a selection of concepts in a simplified format that are further described in the detailed description of the present disclosure. This summary is neither intended to identify key or essential inventive concepts of the disclosure, nor is it intended for determining the scope of the invention or disclosure.

In an embodiment, the present subject matter refers to a method for focusing of an optical imaging apparatus. The method comprises causing illumination of an object using an off-axis illuminating beam to thereby cause generation of a scattered beam. A first set of luminous parameters are derived from a first detected position of a luminous-representation formed by the scattered beam from the object. The illumination-beam is focused upon the object by triggering a movement of the object along an optical-axis in a first direction, the first direction being based on a numerical-representation of the first set of luminous parameters. A second set of luminous parameters are derived from a second detected position of the luminous-representation of the object, wherein the second detected position is related to the first detected position and the movement of the object. Thereafter, the focusing of the illumination beam is ceased based at-least on a numerical-representation of the second set of luminous parameters.

In accordance with an implementation of the embodiment, the focusing of the off-axis illumination-beam is done upon the object through triggering movement of the object along the optical-axis in the first direction, after having derived the first-set of luminous parameters and before deriving the second set of luminous parameters.

In another embodiment, the present subject matter refers to a method of auto-focusing of an optical-imaging apparatus. The method comprises causing illumination of an object using an off-axis illuminating beam to thereby cause generation of a scattered-beam. A set of luminous parameters is derived from a detected position of a luminous-representation formed by the scattered-beam from the object. An auto-focusing operation is performed by triggering movement of the object along an optical-axis in a pre-determined direction, wherein the direction is dependent at-least upon a position-attribute within the set of parameters.

In another embodiment, the present subject matter refers to an optical imaging apparatus comprising an objective-lens configured to project an off-axis illuminating-beam upon an object to thereby cause generation of a scattered beam. An array detector is configured to form a luminous-representation of the object based on the scattered beam from the object. A processing system is configured to derive a first set and a second set of luminous parameters from a first and second detected position of the luminous-representation, respectively, and thereafter determine at least a numerical-representation based upon each derived set of parameters. An actuator is triggered by the processing system upon derivation of the first set of luminous parameters and prior to derivation of the second set of luminous parameters, wherein said linear-actuator is further configured to execute movement of the object along an optical-axis in a first direction defined by the numerical-representation of the first set of parameters to thereby enable focusing of the illumination-beam upon the object. The-actuator is further triggered by the processing system upon derivation of the second set of parameters and determination of the numerical-representation, such that the actuator is now configured to cease the focusing of the illumination beam upon the object.

Overall, the present subject matter facilitates an enhanced focusing with respect to the optical-systems such as microscopic-devices. More specifically, the present subject matter aims at rendering the focusing efficient enough to cover the objects lying far away from the focal plane, i.e. at the distance much larger than the depth of focus. Such efficiency is at-least achieved by virtue of detection of a precise direction in which the object is moved to approach the focal plane during focusing.

To further clarify advantages and features of the invention claimed herein, example descriptions and embodiments are rendered by reference to specific embodiments thereof, which is illustrated in the appended drawings. It is appreciated that these drawings depict only example embodiments of the invention and are therefore not to be considered limiting of its scope. The disclosure will be described and explained with additional specificity and detail with the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1A:
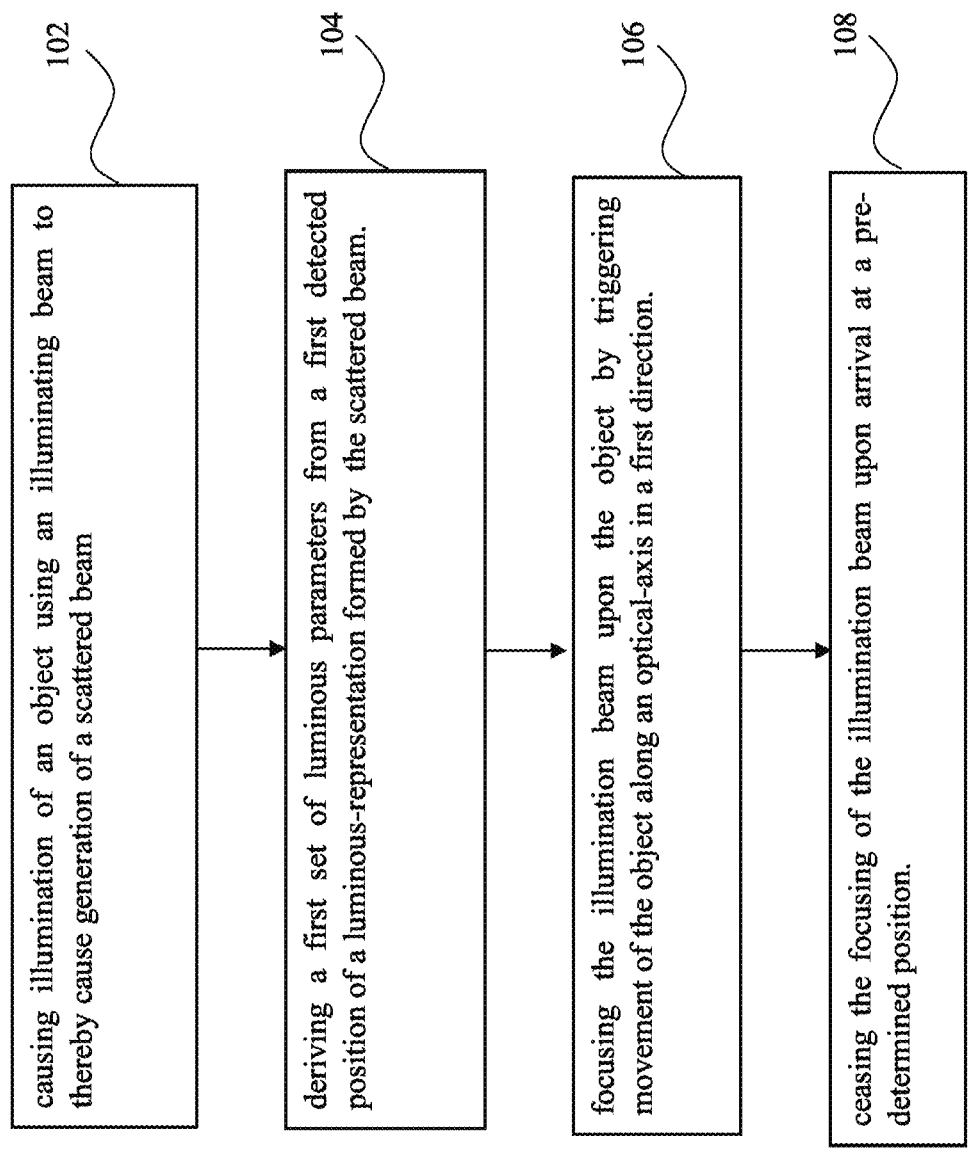
FIGS. 1a and 1b illustrate a method of focusing an optical image apparatus.

Further, skilled persons in the art will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the present disclosure, reference will now be made to the embodiment illustrated in the drawings and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

It will be understood by those skilled in the art that the foregoing general description and the following detailed description are explanatory of the present disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this present disclosure belongs. The system, methods, and examples provided herein are illustrative only and not intended to be limiting.

Embodiments of the present disclosure will be described below in detail with reference to the accompanying drawings.

Figure 1B:
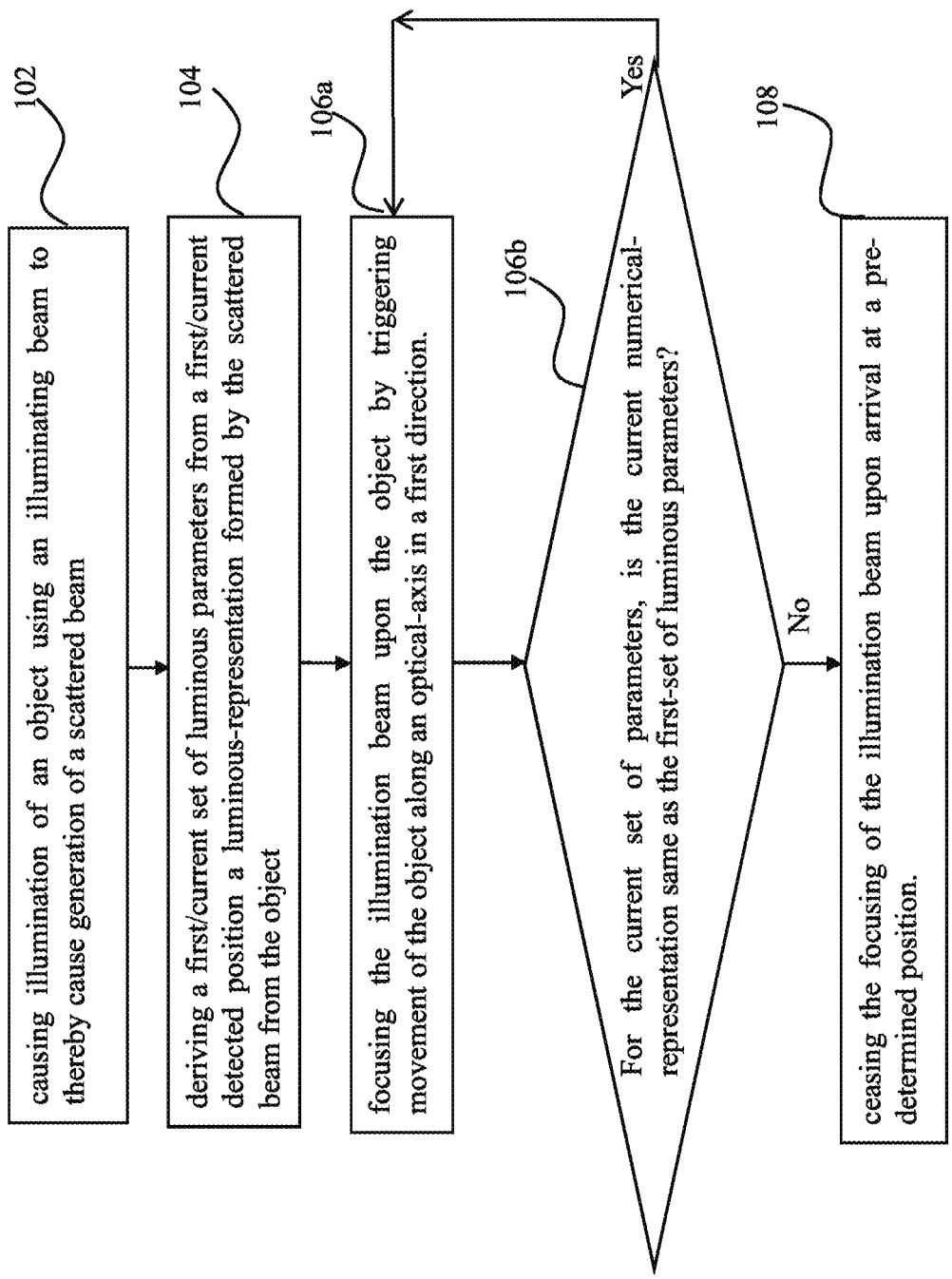

As shown in the figure, FIGS. 1a and 1b illustrates a method of focusing an optical imaging apparatus.

Referring FIG. 1a, the method comprises causing illumination (step 102) of an object using an off-axis illuminating-beam to thereby cause generation of a scattered beam. The illumination of the object is triggered by selectively rotating a frame comprising an off-axis aperture in a first position and a diffuser in a second position to interchangably place the aperture and the diffuser in position with respect to an optical-beam, e.g., a collimated-beam for generating the illuminating-beam. The illumination of the object is caused by transmitting the off-axis illuminating-beam from a source via a beam-splitter to an objective-lens; and thereby focusing the transmitted beam upon the object via the objective lens. Thereafter, in the second position, the illumination of the object is caused by the diffused beam.

Taking into account the aforesaid first position, a first set of luminous parameters are derived (step 104) from a first position of the scattered rays when they impinge an array detector. The parameters are derived from a luminous-representation or a light-spot obtained by projection of the scattered beam from the object upon the array-detector.

As explained later, a second set of luminous parameters may be further optionally derived from a second-detected position of the luminous representation of the object, the second-detected position being related to the first-detected position and the movement of the object. The luminous representation in the second position may correspond to either an image or may still correspond to the light spot, based on whether the object is in-focus or out of focus.

In one implementation, each of the first and second set of luminous parameters correspond to a ratio of (A−B) and (A+B) with respect to each of the first and second detected positions of the luminous-representation. 'A' represents an instantaneous power of the scattered-beam detected by one half of an array detector arranged to render the luminous-representation based on the scattered beam. On the other hand, B represents an instantaneous power of the scattered beam detected by the other half of the array detector. In another implementation, each of the first and second set of parameters represents coordinates of a centroid of a light spot formed by projection of the scattered beam upon the array-detector that is arranged to render the luminous-representation. Hereinafter, such centroid of light-spot has been referred as a 'center of mass'.

In an example, the elements A and B denotes luminance (i.e. luminous intensity per unit area) with respect to the light-spot as detected within the respective halves of the array-detector. Accordingly, each of the first and the second set of parameters denotes ratio of: a) difference between luminance of the light-spot as detected by the two halves of the array-detector, to the b) sum of luminance with respect to said two halves. In another implementation, wherein centroid of the light-spot is acting as an element, each of the first and the second set of parameters represent positions of the light-spot within the array-detector. Further, an axis separating the two-halves of the array-detector may be configured to represent an optical-axis of the optical-imaging apparatus.

After the derivation of the first set of parameters, a movement of the object is triggered along an optical-axis in a first direction for focusing (step 106) the illumination beam upon the object. The movement may involve moving the object itself relative to the objective lens or moving the objective lens relative to the object. Such first-direction corresponds to a direction towards the focal-plane of the optical-imaging apparatus along the optical-axis and is based on a numerical-representation of the first set of luminous parameters. The numerical-representation in-turn corresponds to representation through a unique arithmetic-sign associated with respect to a corresponding numeric-value, the sign being awarded in reference to a location within a coordinate-system associated with the array-detector.

Upon occurrence of said movement, the light-spot as rendered by the array-detector also undergoes a change in location. Due to such location change, the light spot may either remain within a particular half of the array-detector or may begin to be partially rendered in the other-half as well. In respect of the implementation based on detection of luminance, the first-set of parameters remain non-variable as along as the light spot remains rendered within one half of the array detector. The first set of parameters undergoes a change as and when light-spot begins to be at least partially-rendered by other half as well. However, in respect of other implementation based on detection of centroid or light spot, the movement of the object immediately leads to change in position-coordinate of the light-spot within the array-detector, i.e. an immediate-change is recorded within the first set of parameters.

Further, the focusing of the illumination beam is ceased (step 108) in case the movement imparted along the optical-axis in step 106 leads to arrival of the object at a designated location substantially closer to the focal-plane. Such arrival at the designation location corresponds to a position at the central-axis of the array-detector, wherein both A and B turn equivalent to each other i.e. A=B. At this moment, the currently determined luminous parameters neither exhibit a numerical value, nor any numerical representation which corresponds to any numerical sign. In other words, the currently determined set of luminous parameters corresponds to a NULL value. In case of centroid of the light-spot is taken into consideration with respect to said NULL position, the same is observed as positioned within the central-axis of the array-detector.

In another implementation, the motion as imparted to the object in step 106 results in a scenario where the numerical representation of the currently determined set of luminous parameters turns opposite to first-set of luminous parameters. For example, the object moving along the optical-axis towards the focal-plane may transgress the focal-point and accordingly arrive at a designated-location within the optical axis that corresponds to a distance less than the focal-length of the optical-system. Accordingly, the designated location in the present scenario corresponds to a position on the other side of focal plane, when compared with the initial-most position of the object prior to the movement.

In such a scenario, the focusing of the illumination beam is ceased (step 108) based on current or a second set of luminous parameters exhibiting a numerical value like the first-set of luminous parameters but a numerical-representation (i.e. sign) 'different' than the first set of luminous parameters. More specifically, the numerical value of the second set of parameters is represented with the sign 'opposite' to the first set of parameters. Accordingly, the cessation of the focusing in the present scenario coincides with the arrival of the moving object at another designated-location closer to the focal-plane, as compared to aforesaid NULL position.

Overall, the arrival of the moving object at the focal-plane or beyond the focal-plane is electronically registered or detected either due to currently determined set of luminous parameters exhibiting a 'NULL' value or exhibiting a change in 'sign'.

Thereafter, upon the cessation of focusing, the illumination of the object is caused by using a diffused beam to thereby cause generation of a subsequent-scattered beam. Projection of such subsequent-scattered beam causes formation of another luminous-representation at the array-detector, wherein such another luminous-representation may correspond to an image. An intensity-difference between the adjacent pixels of such another luminous-representation formed at the array-detector is monitored. Based thereupon, a focal-length of the optical imaging apparatus is adjusted until such monitored intensity-difference increases by a pre-determined threshold, to thereby cause a fine-focusing of the optical imaging apparatus.

Now referring to FIG. 1(b), the same also illustrates a method of focusing of an optical imaging apparatus, wherein the initial steps 102, 104 and 106a stand equivalent to steps 102, 104 and 106 of FIG. 1a, respectively.

FIG. 1(b) depicts a scenario, wherein movement imparted at the step 106a leads to arrival of the object at such a position in which it is examined whether the current set of luminous parameters as determined exhibit a same 'sign' as otherwise associated with the first-set of parameters determined in step 104. Such type of examination has been depicted in FIG. 106(b).

In case the examination in step 106a results in 'yes', then the control flow gets transferred to step 106a, wherein the object is further moved along the optical-axis towards the focal-plane. Accordingly, in such a scenario, the motion is again imparted along the optical-axis in the same direction as before, i.e. the step 106a repeats itself and resultantly obtained current-set of parameters are checked for 'numerical-value' and numerical representation (i.e. 'sign') through the step 106b.

The repetition of the steps 106a and 106b takes place until there is observed a change in sign associated with the currently-determined set of parameters, said sign change occurring due to either the numerical-value turning NULL or numerical-representation acquiring an opposite sign as compared to the first set of parameters. Accordingly, upon having obtained the examination-result in step 106b as being "NO", the control-flow progresses to step 108. The step 108 of FIG. 1a stands equivalent to the step 108 of FIG. 1b.

Modifications, additions, or omissions may be made to FIGS. 1a and 1b without departing from the scope of the present disclosure. For example, the operations may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 2:
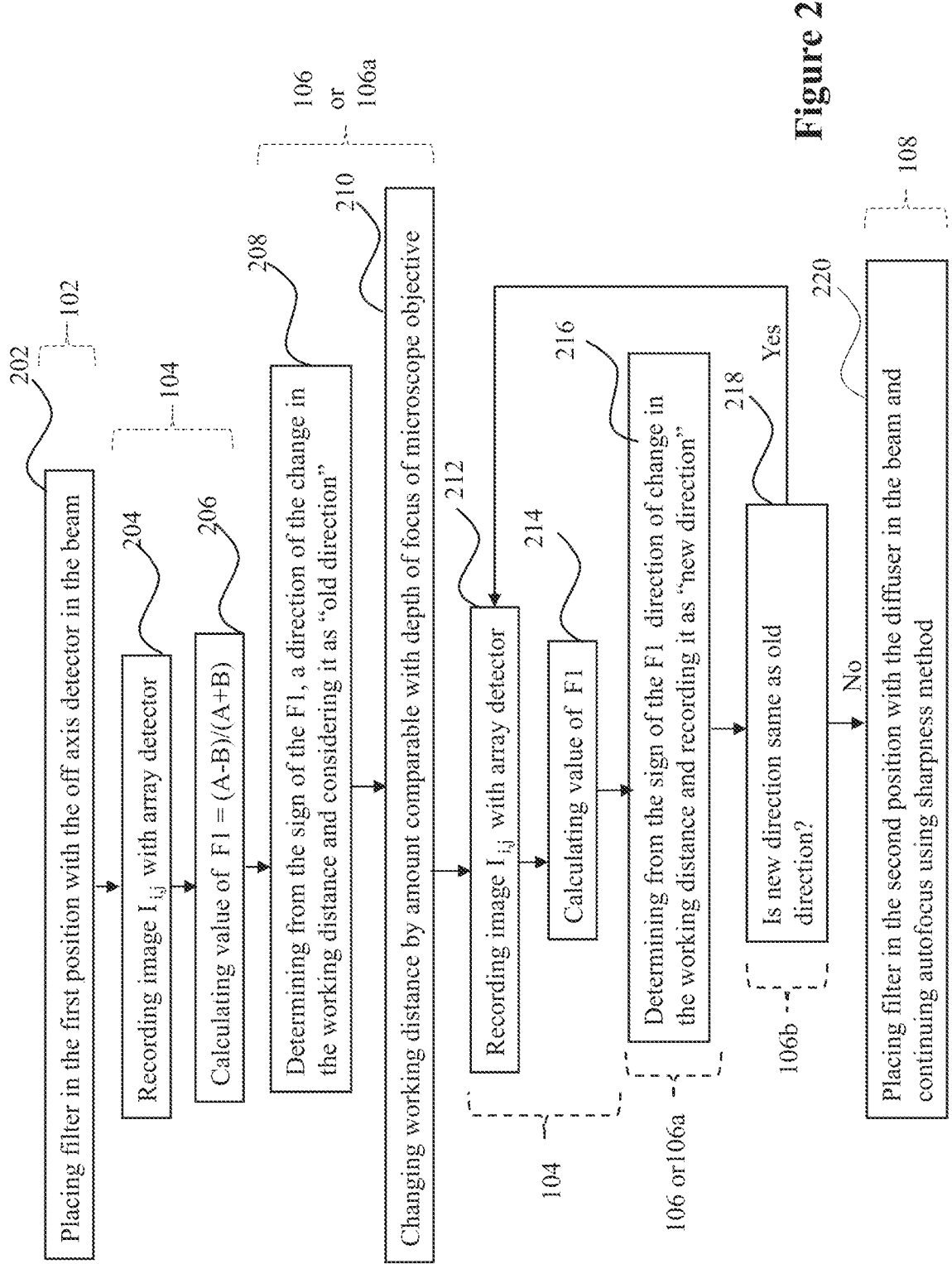
FIG. 2 illustrates an implementation of the method steps as depicted in FIGS. 1a and 1b.

FIG. 2 illustrates an example sequence of method steps, wherein the sequence is based on the method steps as depicted in FIGS. 1a and 1b. Accordingly, the method steps in the sequence as illustrated in FIG. 2 may correspond to a particular step of FIGS. 1a and 1b.

At step 202, the rotatable frame, hereinafter referred to as filter, is placed in a first position so as to cause production of an off-axis beam from the light-source. The off-axis beam denotes a beam offset from the optical-axis, but parallel to the optical-axis. As a result, the off-axis beam is transmitted through a beam-splitter and directed towards an object as intended for illuminating or irradiating the object. The present step 202 may correspond to the step 102 of FIG. 1a.

At step 204, owing to scattering of the off-axis beam from an object, a light-spot representation "Ii,j" may be formed. Such light-spot formation takes place based on capturing of the scattered beam from the object by the array-detector. Moreover, the light-spot as formed corresponds to a first detected position. The present step 204 may correspond to the step 104 of FIG. 1a.

At step 206, a ratio in the form of first set of parameters is calculated as $F1=(A-B)/(A+B)$ in respect of the representation as rendered by the array-detector. As mentioned before, 'A' represents an instantaneous-power of the scattered-beam detected by one-half of the array detector. On the other hand, 'B' represents an instantaneous power of the scattered beam detected by the other half of the array detector. The array-detector renders the light-spot at either of the halves as a result of capturing of the scattered-beam as explained now.

A working-distance 'W' may represent a distance between the object and an objective lens of the corresponding optical device. When the working distance 'W' is smaller than a focal-length of the objective lens, the light-spot impinging the array-detector is detected in the lower-portion of the array detector. Accordingly, in such a scenario, 'A' (assumed to be power detected in upper-half) may be null, while 'B' (assumed to be power detected in lower-half) may have a considerable value.

In other scenario, when the working-distance is larger than the focal-length of the objective lens, then the light spot impinging the array-detector is detected in the upper portion of the array detector. Accordingly, 'A' may have a substantial-numeric value while 'B' is null. Accordingly, merely by observing or detecting the position of the light-spot on the array detector, it may be determined if the working-distance is larger or smaller than the focal-length of the microscope objective lens. The present step 206 may correspond to the step 104 of FIG. 1a.

At step 208, the numerical representation of the ratio is observed to determine a sign (mathematics) associated with the calculated ratio In an example, in case A>B, i.e. power detected in a particularly designated half (say right half) is greater than the other half (say left), then the mathematical sign as associated with a finally-obtained value as associated with F1 is 'positive'. In the alternative, the mathematical sign is obtained as 'negative'.

In other embodiments, F1 may instead be calculated as the center of mass of the light spot detected by the array detector along y axis of the detector. Accordingly, depending upon a current 'y' coordinate of the center of mass and the particular half of the array detector confining said coordinate, a sign of the y coordinate may be determined.

Based on the 'sign' information obtained in the step 208, the direction of change in the working-distance is ascertained and recorded as an "old-direction" or "initial-direction". As a part of pre-configured settings, outcome of a 'positive' or "+" sign in step 208 may denote a current-position of object as being away from the focus of the objective-lens. In such a scenario, the direction of change in the working distance is defined as a direction in which the movement of the object along the optical-axis leads to 'reduction' in the distance between the object and an objective lens. On the other hand, 'negative' or sign may indicate a current position of the object as being between the objective-lens and the focus of the objective lens, thereby indicating the existence of the object on the other side of the focus as compared to the position corresponding to the "positive" or "+" sign. In such a scenario of "negative sign", the direction of change in the working distance also defined as a direction in which the movement of the object along the optical-axis leads to 'reduction' in the distance between the object and an objective lens. However, such direction of change in the working distance corresponding to "negative sign" is exactly opposite to the direction linked with the "positive" sign.

The present step 208 may correspond to the step 106 of FIG. 1a or step 106a of FIG. 1b to the extent of determination of numerical representation or sign.

At step 210, based on the determined direction of motion in step 210, the working-distance i.e. (the distance between the objective lens and object) is changed. The working-distance may be changed by an amount comparable with the 'depth-of-focus' as associated with the objective-lens. The present step 210 may also correspond to the steps 106/106a of FIG. 1.

At step 212, the instantaneous light-spot representation Ii,j of the object undergoing motion (as a result of the step 210) as captured by the array-detector are recorded. The present step 212 corresponds to the step 104 of FIG. 1.

At step 214, the ratio F1 as otherwise calculated in step 206 is also consistently updated in accordance with the object undergoing motion as a result of the step 210. The present step 214 may also correspond to the step 104 of FIG. 1.

At step 216, an instantaneous-sign of the numerical-representation of the ratio is observed and based thereupon, an instantaneous direction of motion required for change in the working-distance is ascertained. For example, if case there is a change in sign from positive to negative or vice-versa, then the instantaneously determined new sign is instead used as an indicator to change the existing direction. As may be understood, the motion-imposed upon object along the optical-axis continuously updates values of F1 and causes movement of the light-spot from the lower to upper half (or vice-versa), thereby leading to a possibility of change in mathematical sign of F1 during with the exhibited-motion. The present step 216 corresponds to the step 106/106a of FIG. 1.

At step 218, the instantaneous-direction as determined is compared with the old-direction as had been earlier determined in the step 208. In case both are equivalent to each other, then the steps 212 till 216 repeat.

However, if the new direction is found different than the older one, then the control is transferred to the step 220. In such a scenario, the instantaneous detected position of the object is considered as the second-detected position. Accordingly, the ratio as determined in step 214 and examined in step 216 with respect to the current or second set of luminous parameters is found either as NULL or as having a considerable numerical value and opposite sign than the first set of luminous parameters. The present step 218 specifically corresponds to the step 106b of FIG. 1.

At step 220, the rotatable filter is placed in a second position to enable production of a diffused beam from the light-source. Thereafter, the object may be focused through the automatic fine-focusing techniques (e.g. contrast-based sharpness method) as known in the art. Accordingly, the step 220 corresponds to step 108.

Modifications, additions, or omissions may be made to FIG. 2 without departing from the scope of the present disclosure. For example, the operations may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 3:
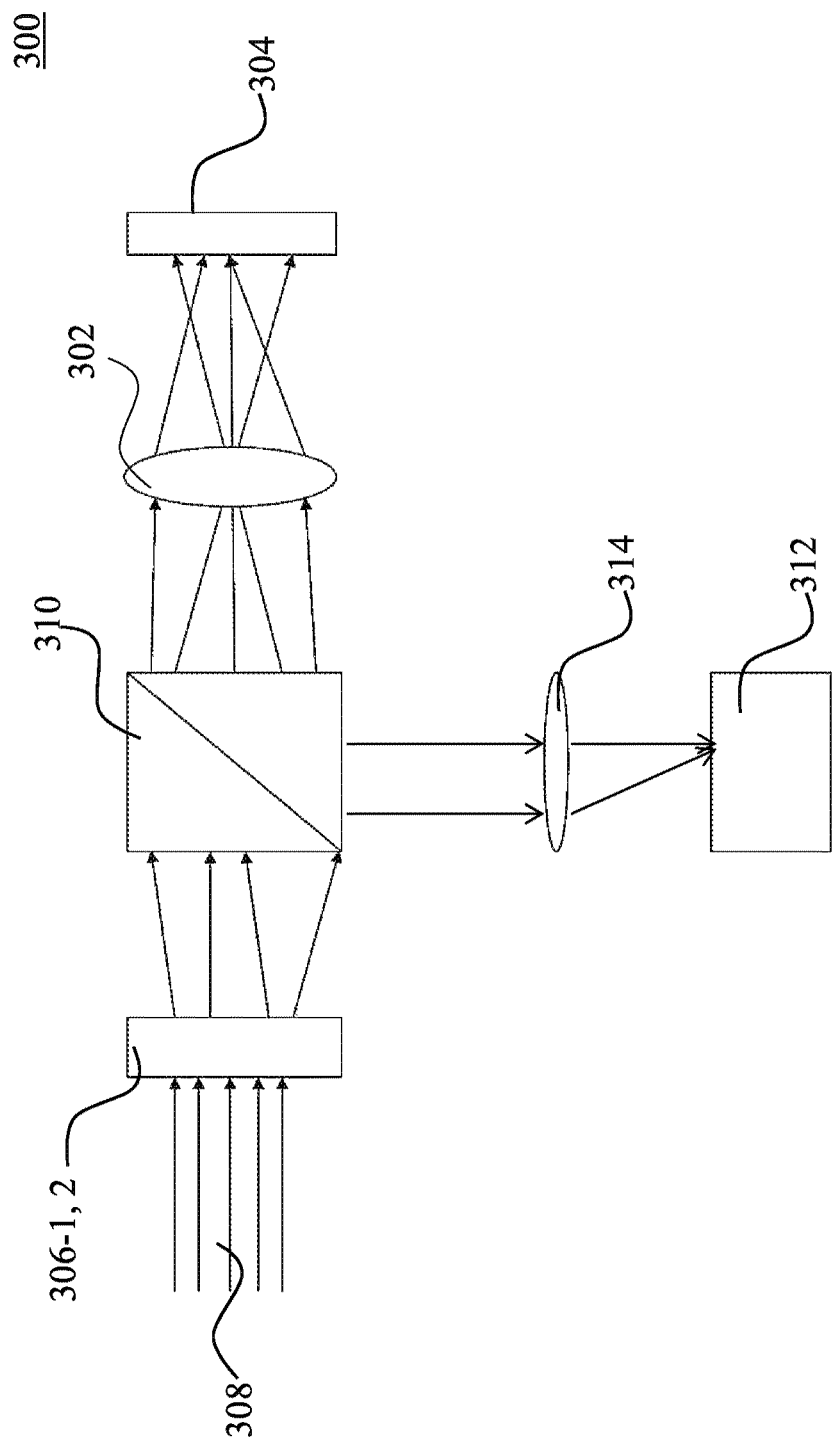
FIG. 3 illustrates an optical-system in accordance with an embodiment of the present subject matter.

FIG. 3 illustrates an optical-system, interchangeably referred as an optical-imaging apparatus 300, in accordance with an embodiment of the present subject matter. An objective-lens 302 is configured to project an illuminating-beam upon an object 304 to thereby cause generation of a scattered beam. Such illuminating beam may be an off-axis beam or a diffused-beam. For such purposes, an off-axis aperture 306-1 may be disposed against a source 308 of the optical-beam to generate an off-axis beam as the illuminating beam. A diffuser 306-2 may also be alternately disposed against the source 308 of optical-beam and configured to generate a diffused beam. The diffuser 306-2 may be adapted to substitute the off-axis aperture 306-1 during cessation of the focusing of the illuminating beam to thereby cause the illumination of the object by the diffused-beam and generation of another scattered beam.

For facilitating the interchangeability, a rotary frame (shown in FIG. 4 to FIG. 6) supports the off-axis aperture 306-1 and the diffuser 306-2 and is rotatable by an actuator for interchangably placing the off-axis aperture 306-1 and the diffuser 306-2 against the optical-beam to generate the illuminating beam and the diffused beam. The source of light may be a collimated light beam.

Further, a beam-splitter 310 is configured to transmit the illuminating-beam (whether diffused or off-axis) from the source 308 to the objective-lens 302. An array detector 312 is configured to form a light-spot or image of the object based on the scattered beam from the object. A camera-objective lens 314 is configured to focus the scattered beam upon the array detector 312. The array-detector 312 may be a charge coupled device (CCD) and configured to receive the scattered beam focused from the camera-objective lens 314 and render a light or image there-from.

A processing system (not shown in figure) constitutes the electronics of the optical-system 300 and is enabled by a computing-system. The processing system is connected to the array detector 312 for ceasing the performance of operations corresponding to the method steps 104 and 106 and accordingly continuously calculates the instantaneous position of the object undergoing motion as a part of focusing. Based on such calculations, the arrival of the moving object about the focal-plane is indicated by virtue of a numerical representation as exhibited by the second set of parameters (i.e. mathematical sign as associated with the value of F1). A computer system 1400 of FIG. 14 below is an example of the processing system.

An actuator (shown later in FIG. 6) may be triggered by the processing system upon derivation of the first set of luminous parameters and prior to derivation of the second set of luminous parameters. Such actuator is configured to execute a linear-movement of the object along an optical-axis in the first direction defined by the numerical-representation of the first set of luminous parameters to thereby enable focusing of the illumination-beam upon the object. More specifically, the processing system evaluates the function F1 with respect to an instantaneous position of the object, determines the direction in which the working-distance has to be changed and accordingly commands the actuator. The actuator linearly moves the object in a given direction towards the focal-plane of the optical-imaging apparatus 300 along the optical-axis, until the sign associated with the ratio F1 (as gathered by the corresponding numerical-representation) changes to 'null' or an opposite sign. If each step of motion imparted to the object by the linear-actuator is comparable in length to depth of focus of the objective-lens 302, then at the moment of sign-change, the object resides at the distance smaller than a depth of focus. This may be an effective distance as attained for ceasing the currently pursued focusing (i.e. coarse focusing) and trigger a fine-focusing operation upon the object.

Further, the actuator may be further triggered to render an additional-type of motion as a rotary motion. The actuator is triggered by the processing system upon derivation of "NULL" or the second set of parameters to rotate and thereby align the diffuser with the illumination source to produce a diffused-beam. Accordingly, the actuator may cease the focusing of the off-axis illumination beam upon the object through the off-axis aperture and instead may trigger the focusing through the diffused-beam.

Further, a monitoring-module constituting the electronics of the optical system is configured to ascertain an intensity-difference between the adjacent pixels of the subsequent luminous-representation, i.e. the image formed at the array-detector, based on the projection of the scattered-beam from the object upon having been illuminated by the diffused-beam. Based upon the intensity difference as ascertained by the monitoring-module, a focal-length adjuster is configured to cause a fine-focusing of the optical imaging apparatus 300 by adjusting a focal-length of the optical imaging apparatus till the ascertained intensity difference increases by a pre-determined threshold.

Figure 4:
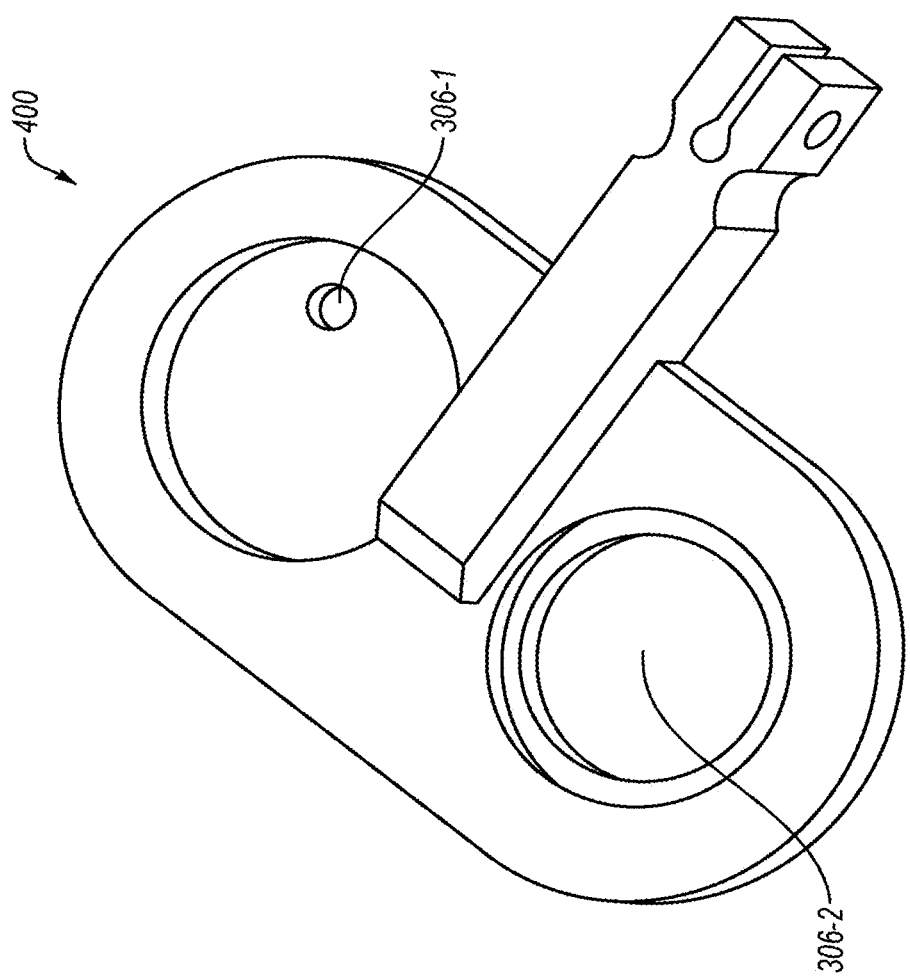
FIG. 4 illustrates a rotatable-frame within the optical-system of FIG. 3.

FIG. 4 illustrates a rotatable-frame 400 within the optical-system 300 of FIG. 3. The rotatable-frame 400 may be rotated or pivoted about a fixed point to place or position itself in the first-position or the second-position. An actuator (shown in FIG. 6) may be used to trigger such rotation about a fixed point. Further, the rotatable-frame 400 comprises two hollow portions extending vertically. While one of the hollow portions encloses the off-axis aperture 306-1, the other hollow-portion encloses the diffuser 306-2.

Figure 5B:
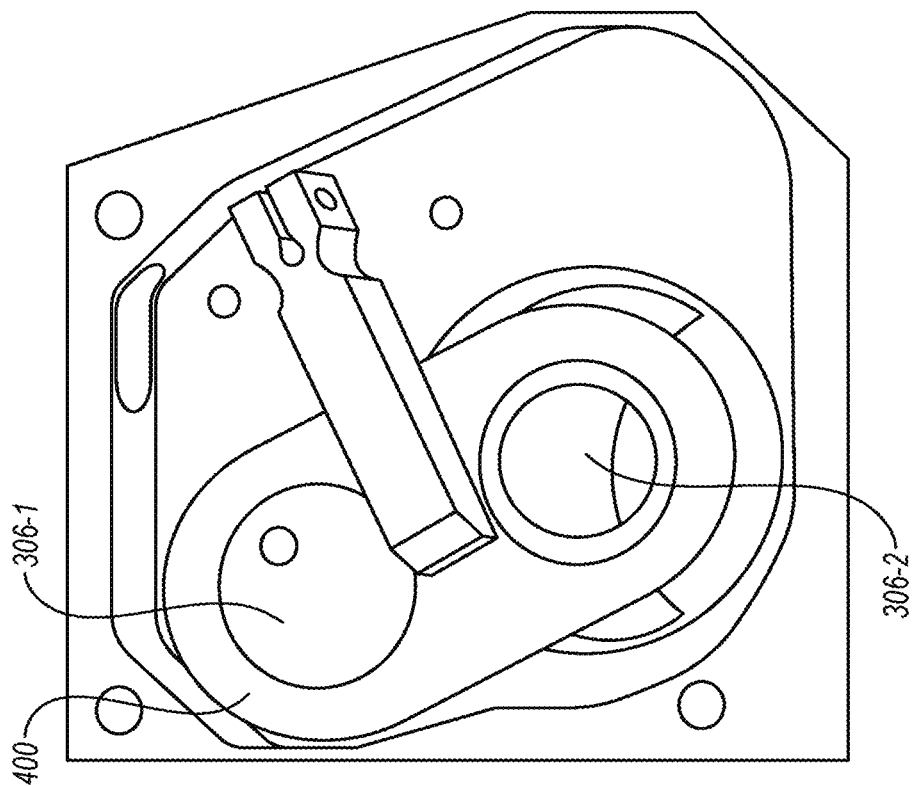
FIGS. 5a and 5b illustrate different-states of the rotatable-frame in an assembly as depicted in FIG. 3.
Figure 5A:
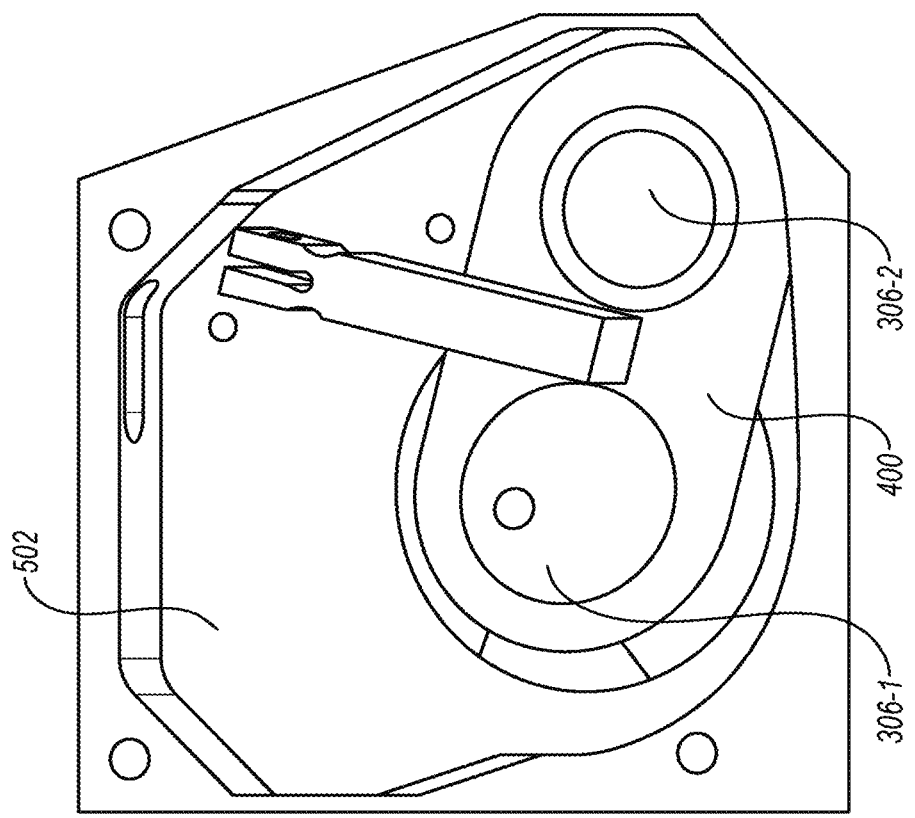

FIGS. 5a and 5b illustrate the rotatable-frame 400 pivoted over a block 502 and exhibiting two-different positions/states upon its rotation. The rotatable-frame 400 by virtue of its rotation places the off-axis aperture 306-1 and diffuser 306-2 in alignment with a passage within the block 502 at different instants of time, thereby leading to exhibition of two different positions: a first position and a second position.

Figure 7:
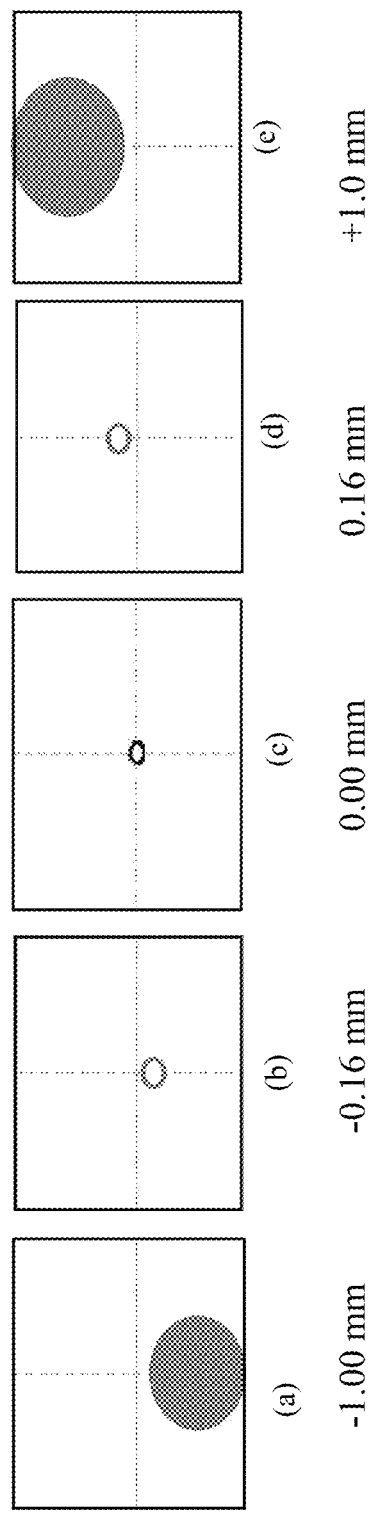
FIG. 7 illustrates diagrammatical-representation of the optical beam as simulated on the array detector within the optical-system of FIG. 3 for different distances between the object and the array-detector.
Figure 8:
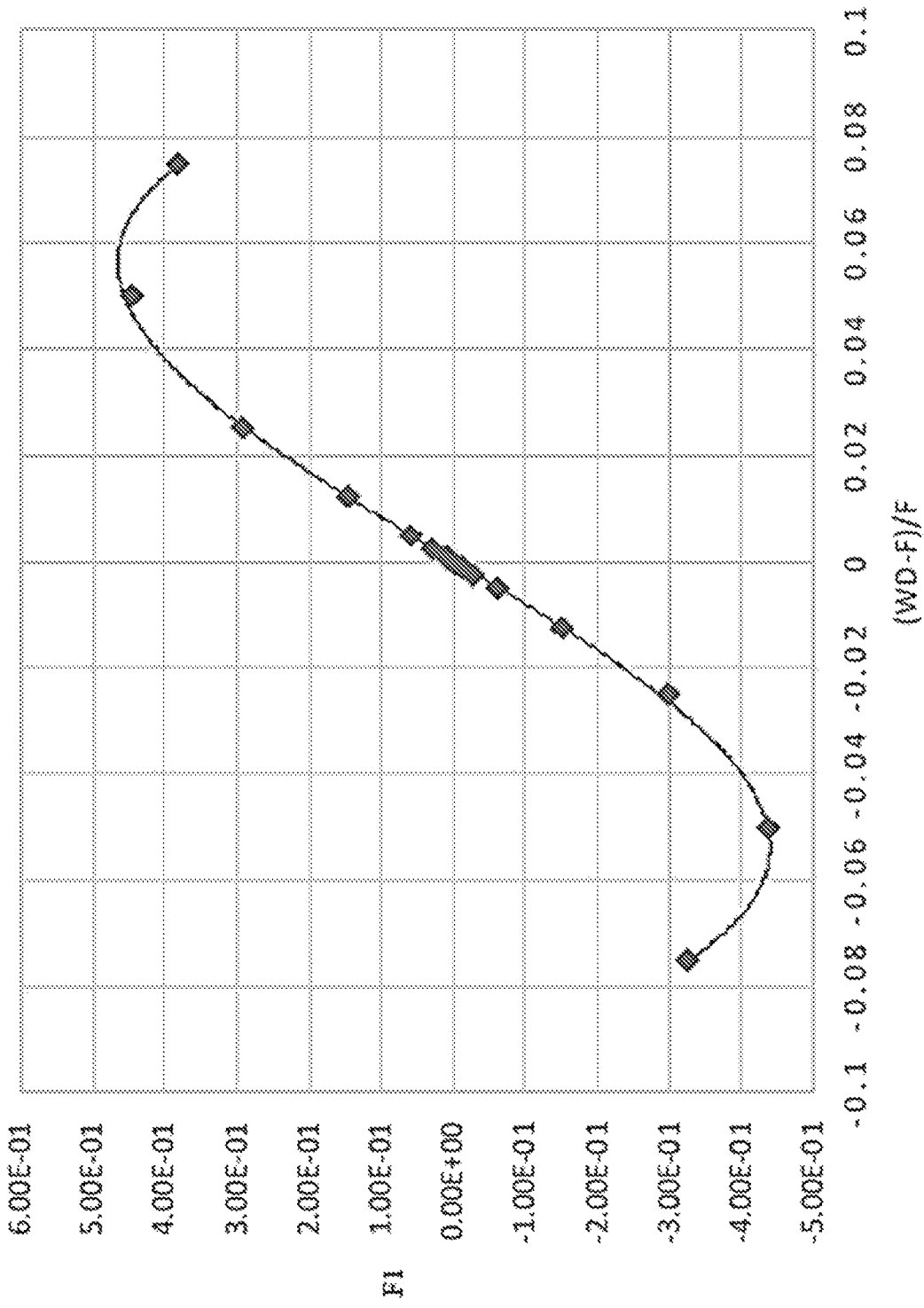
FIG. 8 illustrates a graphical-representation depicting plots that illustrate ratios associated with focusing an optical system.

In the first-position as depicted in FIG. 5a, the rotatable-frame 400 aligns the off-axis aperture 306-1 with the collimated-beam of light, thereby forming an off-axis collimated beam having a smaller-diameter. Such off-axis beam, after having been transmitted through the beam-splitter 310 and directed by the objective 302 lens upon the surface of the object 304, impinges the object 304 in an off-axis spot. The position of such spot is later detected by the array-detector 312, for example, as represented in FIG. 7, and FIG. 8. In the second position as depicted in FIG. 5b, the frame 400 places the diffuser 306-2 in the path of the collimated beam, and transforms the optical system 300 into a common reflective microscope.

Figure 6:
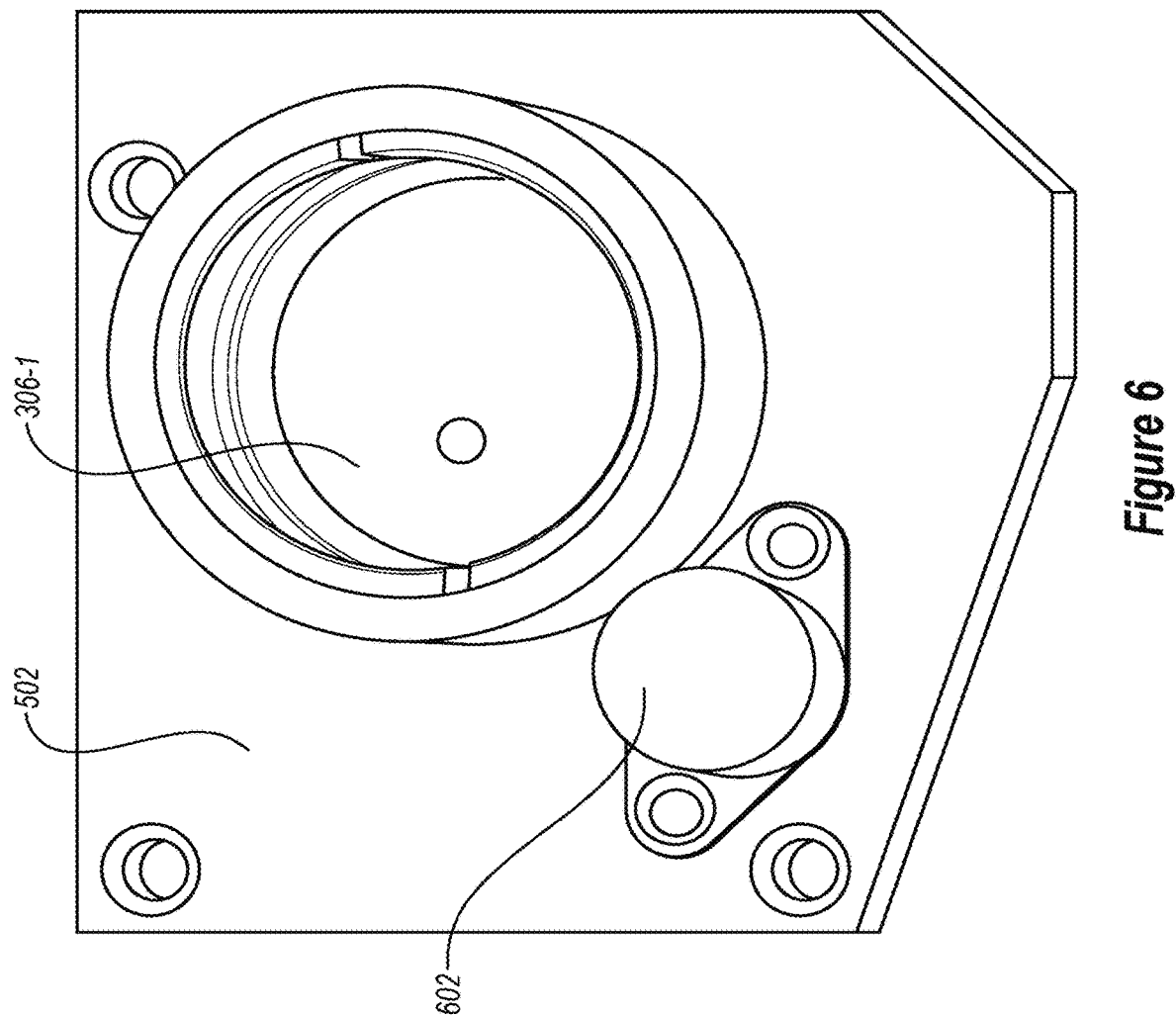
FIG. 6 illustrates a bottom-view of the rotatable frame assembly in FIG. 5.

FIG. 6 illustrates a bottom-view of the assembly of the rotatable frame 400 with the block 502 as shown in FIG. 5, thereby depicting an actuator 602 for rotating the rotatable-frame 400 with respect to the block 502. The actuator 602 upon rotation substitutes the off-axis aperture 306-1 with the diffuser 306-2 and vice versa also, thereby discretely aligning and de-aligning the off-axis aperture 306-1 and diffuser 306-1 with respect to the collimated light-beam. The actuator 602 as connected to the rotatable-frame 400 may be a rotary motion source. In addition, the actuator 602 may also configured to exhibit a translation-motion (e.g. through a lead-screw mechanism) to execute the motion of the object along the optical-axis in line with the steps 106, 106a, and 210 in FIG. 1a, FIG. 1b and FIG. 2.

FIG. 7 illustrates diagrammatic-representation of the optical-beam as simulated on the array detector for different distances between the object and the array detector. FIGS. 7(a), (b) . . . (e) correspond to working distance (W) −1.00 mm, −0.16 mm, 0.00 mm, 0.16 mm, +1.0 mm, respectively.

As can be observed from FIG. 7, when the working distance (W) is smaller than focal length of the objective lens, the light spot impinging the array detector is located in the lower portion of the array detector (as exemplarily depicted in FIG. 7a and FIG. 7b). When the working-distance is larger than the focal-length of the microscope objective the light spot impinging the array detector is located in the upper portion of the array detector (as exemplarily depicted in FIG. 7d and FIG. 7e). By observing the position of the light spot upon the array detector, it may be determined if the working distance is larger or smaller than the focal-length of the objective-lens.

As a matter of quantifying position of the light-spot impinging array-detector by the processing system, an example implementation has been provided. As per the factory settings, the centre of the off-axis aperture within the rotatable-frame is placed along y axis of the array detector in accordance with the plane of the figure as shown in FIG. 3. Upon defining a coordinate of the array detector along the horizontal axis of FIG. 3, a function may be defined that characterizes position of the light spot as the first/second set of luminous parameters as would be seen by a two-segment position sensing detector.

$$F1 = (A - B)/(A + B)$$

wherein $$A = \sum_{i=N/2}^{N-1} \sum_{j=0}^{M-1} I_{i,j}$$

and $$B = \sum_{i=0}^{N/2} \sum_{j=0}^{M-1} I_{i,j}$$

wherein
the i index extends along y-axis,
and j-index extends along x axis,
N, M are number of pixels of array detector in y and x direction respectively, and
$I_{i,j}$ is the power of light impinging pixel having indexes i,j.

In another implementation, the first/second set of luminous parameters as designated by F1 may be derived as a 'y' coordinate of center of mass ($Cm_y$) of the observed light spot in respect of the center of the detector N/2 and M/2:

$$F1 = \frac{\sum_{i=0}^{N-1} \sum_{j=0}^{M-1} i \cdot I_{i,j}}{\sum_{i=0}^{N-1} \sum_{j=0}^{M-1} I_{i,j}} - \frac{N}{2}$$

wherein
the i index extends along y-axis,
and j-index extends along x axis,
N, M are number of pixels of array detector in y and x direction respectively, and
I i,j is the power of light impinging pixel having indexes i,j.

FIG. 8 illustrates a graphical-representation illustrating a plot of F1 as a function of the distance between sample and focal plane. While the present FIG. 8 has considered the ratio F1 as $$\frac{(A - B)}{(A + B)},$$

in another example F1 may also correspond to a centre of mass ($Cm_y$) as earlier discussed in FIG. 7

In the present graphical representation, while the y-axis represents F1, x-axis represents an identifier corresponding to the working-distance and focal-length. Such identifier may be in turn a ratio denoted by (WD-F)/F, wherein WD is the working-distance and F is the focal length of the microscope objective-lens. Accordingly, the graphical-representation of FIG. 8 may be appropriated to determine as to whether the object is too close or far from the focal plane of objective-lens.

As may be inferred from the representations in the FIGS. 7 and 8, the optical system 300 when operating in the first position (i.e. off-axis aperture in alignment with the collimated-beam) may detect using a single measurement, as to whether the distance between the sample and the objective lens objective lens is too small or too large.

Figure 9:
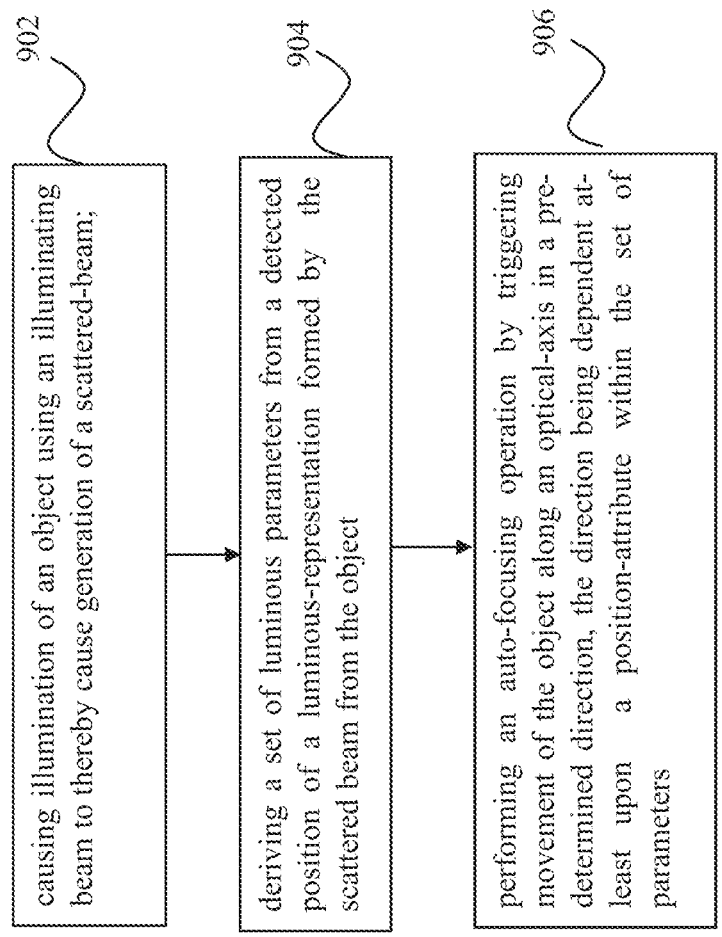
FIG. 9 illustrates method steps in accordance with another embodiment of the present subject matter.

FIG. 9 illustrates a method of auto-focusing of an optical imaging apparatus in accordance with another embodiment of the present subject matter.

The method comprises causing (step 902) illumination of an object using an illuminating beam to thereby cause generation of a scattered-beam and corresponds to the step 102 of FIG. 1.

Further, a set of luminous parameters are derived (step 904) from a currently detected position of a luminous-representation of the object, wherein the luminous-representation is based on projection of the scattered beam and corresponds to a light-spot. The position-attribute within the set of parameters corresponds to a current-position of a centre of mass of the light-spot with respect to a focal plane of the optical imaging apparatus, the centre of mass being detected through the array-detector. Such position-attribute associated to the set of luminous parameters is analysed to enable calculation of a distance required to be traversed as a part of movement along the optical-axis to attain the auto-focusing.

The direction and distance as calculated from the set of luminous parameters is based on a pre-determined criteria established during historical-autofocusing exhibited by the optical-imaging apparatus. The criteria may be a pre-derived relation between:

(a) a distance traversed by the object along the optical-axis during the historically conducted autofocusing; and (b) a horizontal/vertical shift exhibited by the center-of-mass of the light-spot in an array-detector during such autofocusing.

Further, the method comprises performing (step 906) an auto-focusing operation by triggering movement of the object along an optical-axis in a designated direction. Such direction of movement is dependent at-least upon the position-attribute within the set of parameters. Further, as a part of autofocussing, the distance covered by the object during the movement is also determined from the position-attribute.

Figure 10:
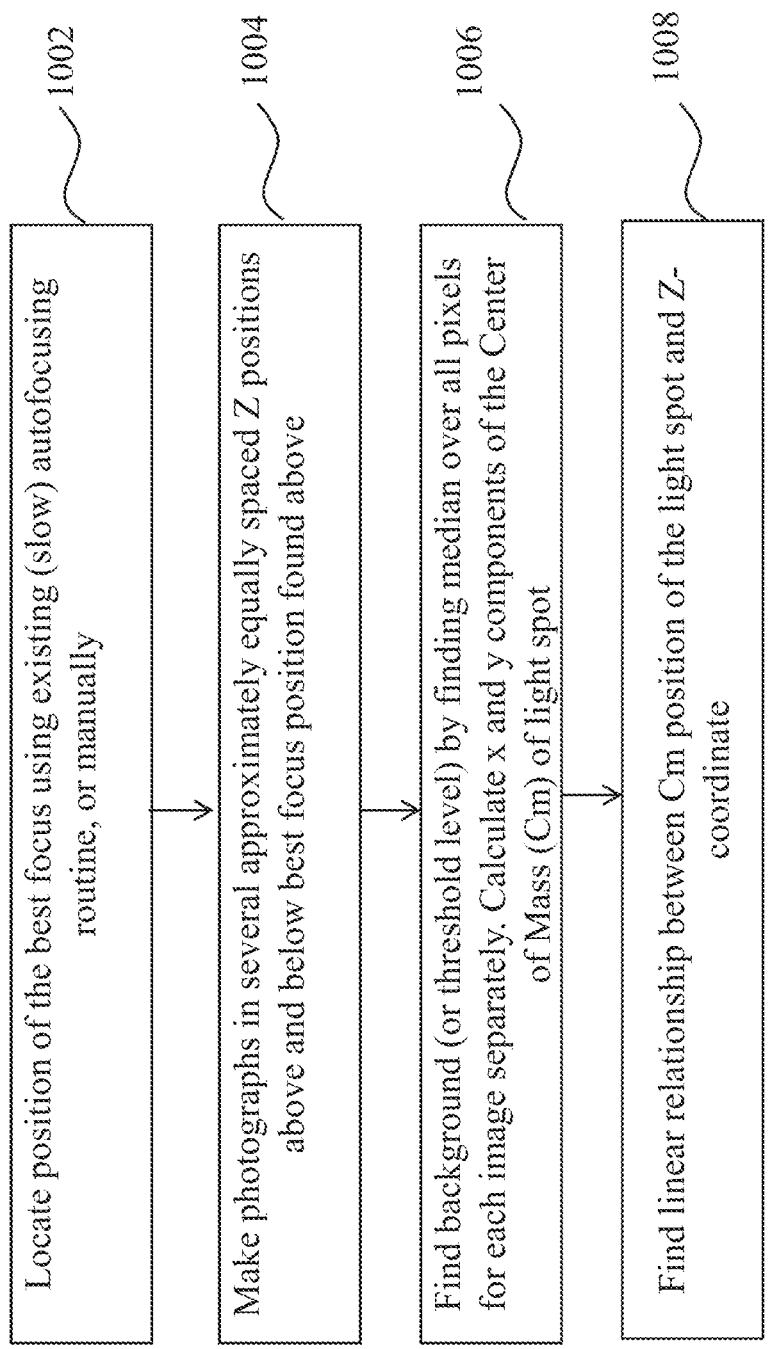
FIG. 10 illustrates an example implementation in accordance with another embodiment of the present subject matter.

FIG. 10 illustrates an example implementation of the method steps as depicted in FIG. 9. More specifically, FIG. 10 illustrates process as needed for defining the criteria as otherwise needed execution of the method step 906, i.e. derivation of the direction and distance as required for defining a movement of the object along the optical-axis during the autofocussing. Such process may be executed during a normally executed auto-focussing operation of the object to set the aforesaid-criteria that may be later applied during the performance of method steps of FIG. 9.

At step 1002, during the autofocussing, a position corresponding to a 'best-focus' position upon the optical-axis may be noted or logged. In an example, such 'best-focused' image is determined through any of known autofocussing (e.g. contrast-detection based, phase-detection based) or fine-focusing techniques as associated with the optical-imaging devices. In other example, the best-focus image may also be determined through manually performed fine-focusing techniques. Once determined, the position corresponding to the 'best-focus' image may be logged either manually or electronically using the existing (slow) autofocusing routine.

At step 1004, various images may be captured through the array-detector with respect to equally spaced z-axis positions above and below 'best focus' position found in step 1002. More specifically, the object as focused upon in step 1002 may be displaced along the optical-axis (i.e. z-axis) by equal amounts (i.e. steps) at either side of the 'best-focus' position and resultant luminous-representation at such 'lesser-focus' positions may be captured through the array-detector.

At step 1006, a background-luminosity with respect to captured images in step 1004 may be determined by finding a median over all pixels for each image, separately. Thereafter, x and y components of the 'centre of mass of light-spot' i.e. may also be captured with respect to each image separately.

More specifically, $Cm_x$ may be calculated as the 'x' coordinate of center of mass of observed light spot in respect of the center of the detector N/2 and M/2:

$$\frac{\sum_{i=0}^{N-1} \sum_{j=0}^{M-1} j \cdot I_{i,j}}{\sum_{i=0}^{N-1} \sum_{j=0}^{M-1} I_{i,j}} - \frac{M}{2}$$

Likewise, $Cm_y$ may be calculated as the 'y' coordinate of center of mass of observed light spot in respect of the center of the detector N/2 and M/2:

$$\frac{\sum_{i=0}^{N-1} \sum_{j=0}^{M-1} i \cdot I_{i,j}}{\sum_{i=0}^{N-1} \sum_{j=0}^{M-1} I_{i,j}} - \frac{N}{2}$$

wherein the i index extends along y-axis, and j-index extends along x axis,

N, M are number of pixels of array detector in y and x direction respectively, and I i,j is the power of light impinging pixel having indexes i,j.

At step 1008, a relationship is obtained that depicts variation between a) the $Cm_x$ and $Cm_y$ components as determined in step 1006 and b) z coordinate correspond to various z-axis positions as determined in step 1004. In an example, such relationship may be linear or approximately linear.

The aforesaid steps from 1004 till 1008 may be executed (as a part of defining the aforesaid criteria) once or twice in a day during the autofocusing and may be termed as a calibration exercise with respect to the optical-system 300.

Figure 11:
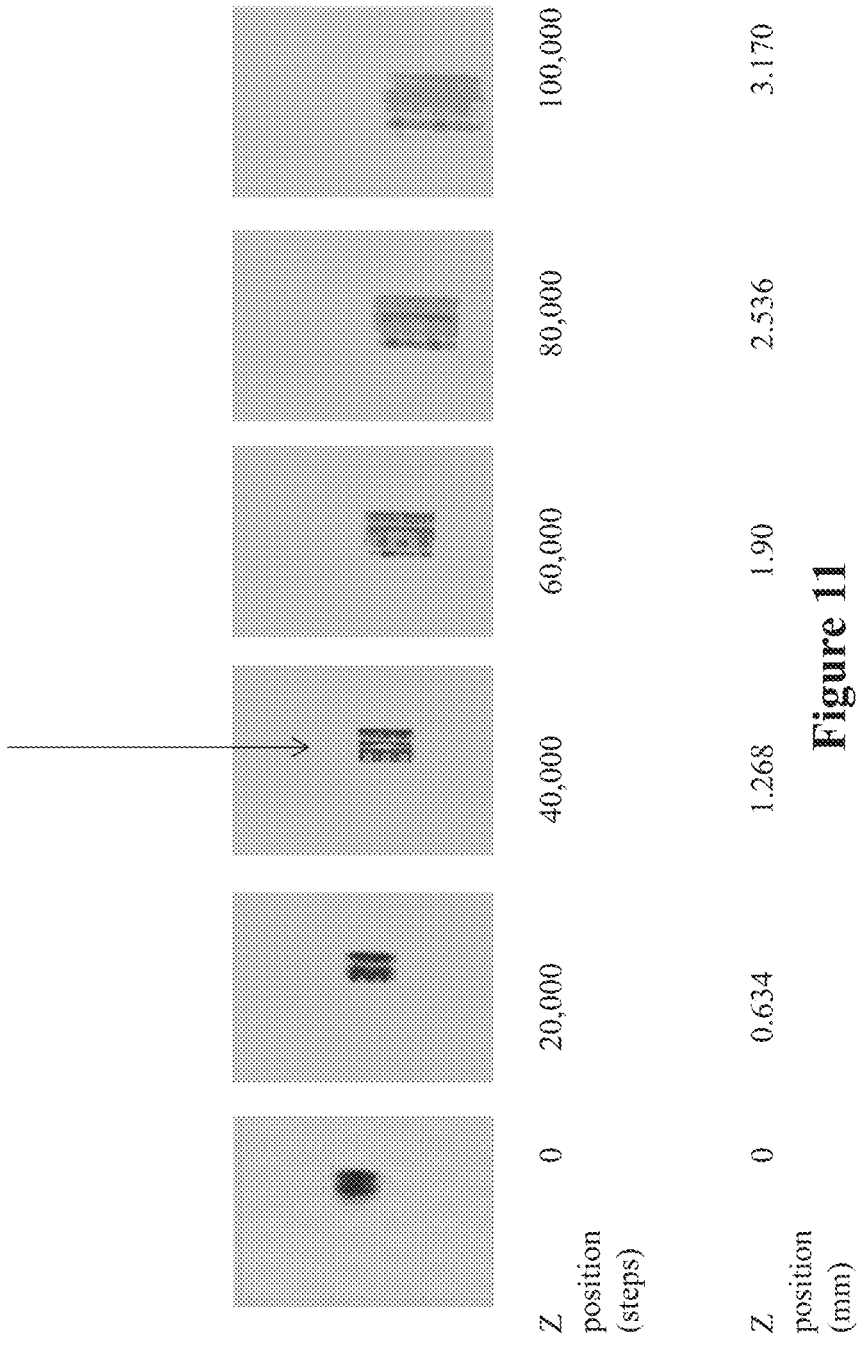
FIG. 11 illustrates an actual-photographic representation of the shift of the center of mass of light spot during an autofocus mode, in accordance with an implementation of the method steps of FIG. 10.

FIG. 11 illustrates an actual-photographical representation of the shift of the centre of mass of light spot during an autofocus mode in accordance with an implementation of the method steps of FIG. 10. More specifically, the different images as depicted correspond to the step 1004. As depicted in the present figure, various images or light-spots as captured correspond to equally-spaced different positions of the object along the z-axis (i.e the optical axis). Such positions along the z-axis have been depicted in terms of 'number' of steps as well as in millimetres.

Figure 12:
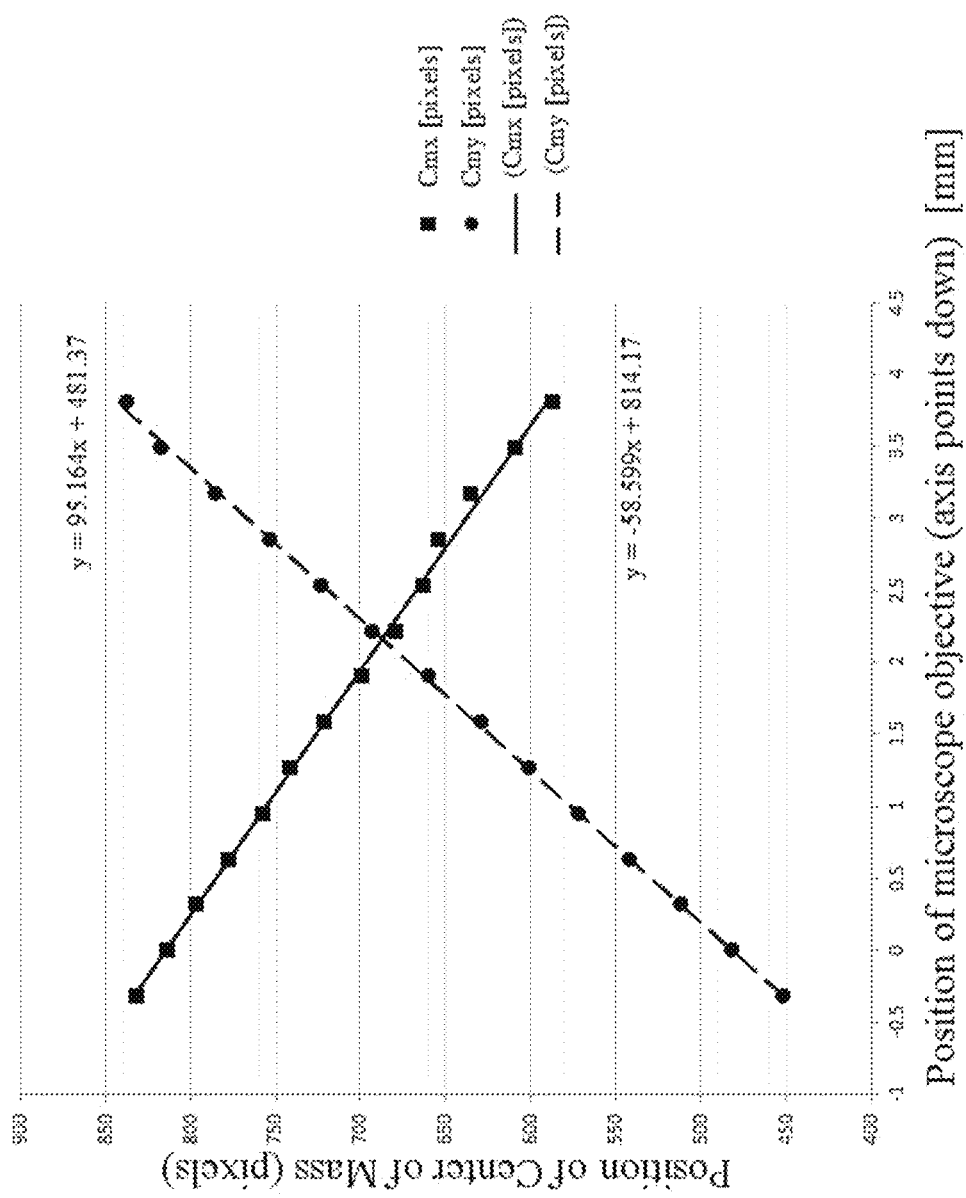
FIG. 12 illustrates a graphical representation in respect of shift of the center of mass of light spot during an autofocus mode, in accordance with an implementation of the method steps of FIG. 10.

FIG. 12 illustrates a graphical representation in respect of shift of the center of mass of light spot during an autofocus mode, in accordance with an implementation of the method steps of FIG. 10. More specifically, the graphical-representation in present FIG. 12 corresponds to the relation as calculated during the method step 1008 and depicts the variation of each of the x and y components of the centre of mass of the light-spot against a variation in position of object along the z-axis (i.e. the optical-axis). More essentially, FIG. 12 depicts two kinds of relationship as follows:

a) variation in $Cm_x$ versus variation in position along z-axis.

b) variation in $Cm_y$ versus variation in position along z-axis.

Figure 13:
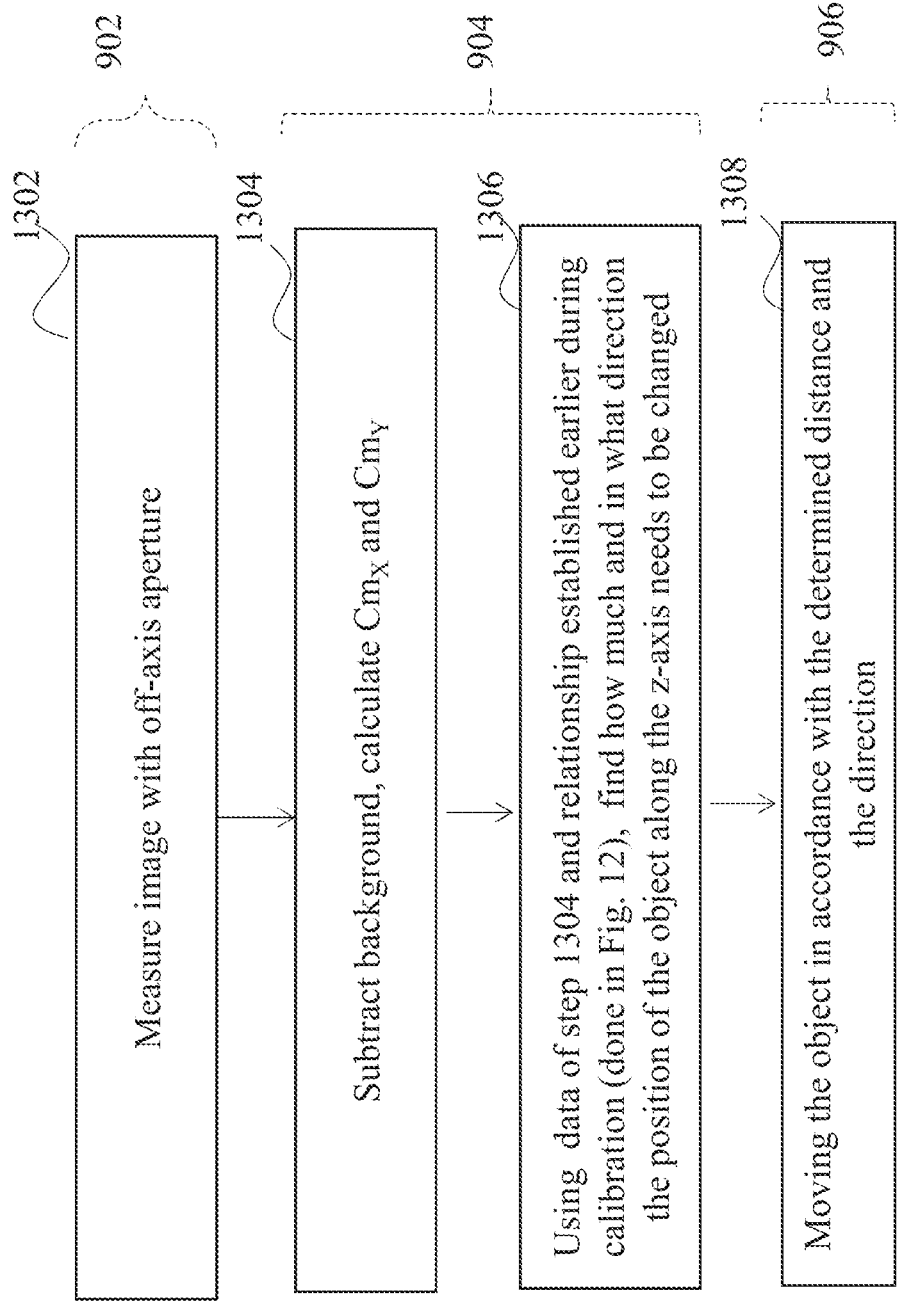
FIG. 13 illustrates an example-implementation of the method steps as depicted in FIG. 9.

FIG. 13 illustrates another example-implementation of the method steps as depicted in FIG. 9.

At step 1302, a light-spot is formed at the array-detector through aligning an off-axis aperture with the collimated beam and obtaining a scattered beam from the object illuminated by the off-axis beam. The present step 1302 corresponds to the step 902.

At step 1304, a background-luminosity is subtracted with respect to the current image at the array-detector. A centre of mass of the current light-spot, as detected by the array detector along x and y axis of the detector, is calculated as $Cm_x$ and $Cm_y$. The present step 1304 corresponds to the step 904.

At step 1306, the currently obtained Cmx and Cmy in step 1304 are compared with the pre-determined criteria (i.e. relationship) as illustrated in FIG. 12. Using such data and criteria established earlier during calibration, it is determined as to how much and in what direction the position of the object along the z-axis needs to be changed as a part of autofocusing. The present step 1306 corresponds to the step 906.

At step 1308, based on direction and distance as determined in step 1306, the object is moved along the optical-axis towards the focal plane of the objective lens to attain auto-focusing. The present step 1308 corresponds to the step 906.

Figure 14:
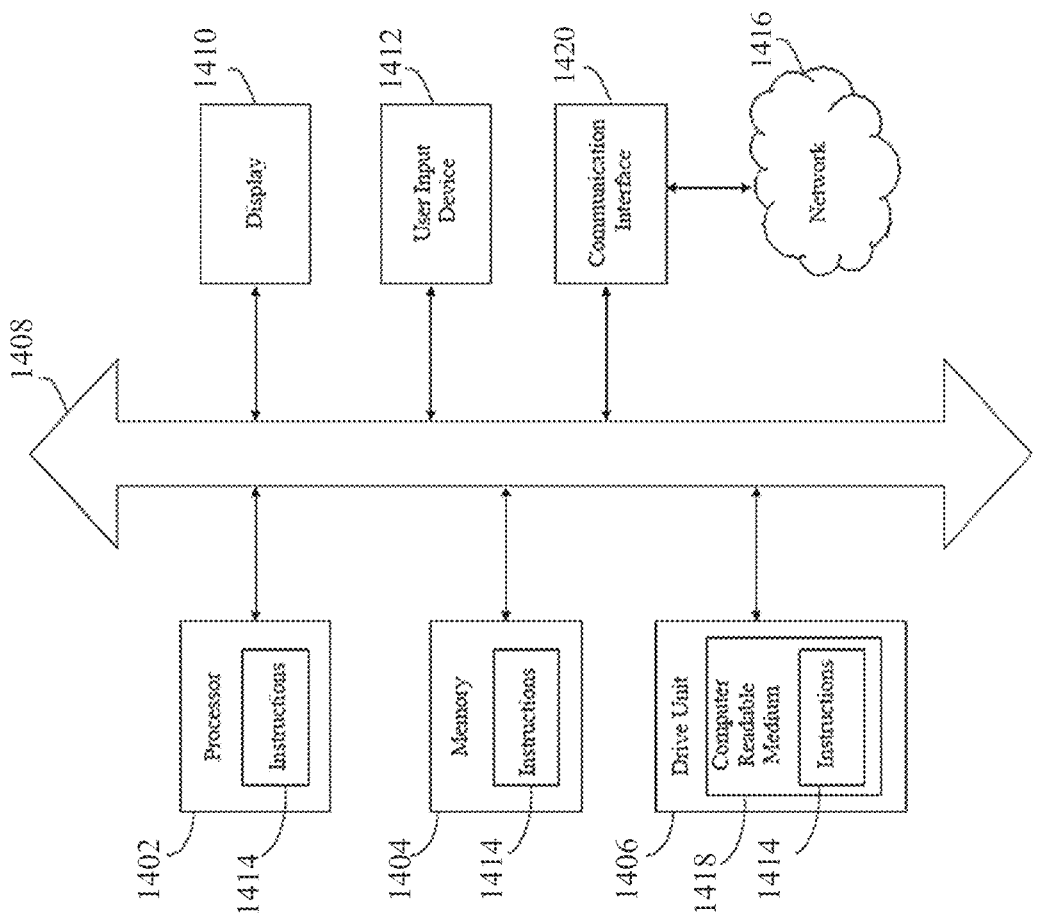
FIG. 14 depicts a computing-device based implementation of the system as depicted in accordance with in accordance with the embodiment of the present subject matter.

FIG. 14 shows yet another example implementation in accordance with the embodiment of the present disclosure. More specifically, the present figure illustrates a typical hardware configuration of the processing system and monitoring module (as linked with linked optical-system 300 of FIG. 3) in the form of a computer system 1400 is shown. The computer system 1400 can include a set of instructions that can be executed to cause the computer system 1400 to perform any one or more of the methods disclosed. The computer system 1400 may operate as a standalone device or may be connected, e.g., using a network, to other computer systems or peripheral devices.

In a networked deployment, the computer system 1400 may operate in the capacity of a server or as a client user computer in a server-client user network environment, or as a peer computer system in a peer-to-peer (or distributed) network environment. The computer system 1400 can also be implemented as or incorporated across various devices, such as a personal computer (PC), a tablet PC, a personal digital assistant (PDA), a mobile device, a palmtop computer, a laptop computer, a desktop computer, or any other machine capable of executing a set of instructions (sequential or otherwise) that specify actions to be taken by that machine. In an example implementation, the computer system 1400 may be a mobile computing cum display device capable of being used by a user. Further, while a single computer system 1400 is illustrated, the term "system" shall also be taken to include any collection of systems or sub-systems that individually or jointly execute a set, or multiple-sets, of instructions to perform one or more computer functions.

The computer system 1400 may include a processor 1402 e.g., a central processing unit (CPU), a graphics processing unit (GPU), or both. The processor 1402 may be a component in a variety of systems. For example, the processor 1402 may be part of a standard personal computer or a workstation. The processor 1402 may be one or more general processors, digital signal processors, application specific integrated circuits, field programmable gate arrays, servers, networks, digital circuits, analog circuits, combinations thereof, or other now known or later developed devices for analysing and processing data The processor 1402 may implement a software program, such as code generated manually (i.e., programmed).

The computer system 1400 may include a memory 1404, such as a memory 1404 that can communicate via a bus 1408. The memory 1404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1404 includes a cache or random access memory for the processor 1402. In alternative examples, the memory 1404 is separate from the processor 1402, such as a cache memory of a processor, the system memory, or other memory. The memory 1404 may be an external storage device or database for storing data. The memory 1404 is operable to store instructions executable by the processor 1402. The functions, acts or tasks illustrated in the figures or described may be performed by the programmed processor 1402 executing the instructions stored in the memory 1404. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As illustrated, the computer system 1400 may or may not further include a touch-sensitive display unit 1410, for outputting determined information as well as receiving a user's touch-gesture based inputs, such as drag and drop, single tap, multiple-taps, etc. The display 1410 may act as an interface for the user to see the functioning of the processor 1402, or specifically as an interface with the software stored in the memory 1404 or in the drive unit 1406.

Additionally, the computer system 1400 may include an input device 1412 configured to allow a user to interact with any of the components of system 1400. The computer system 1400 may also include a disk or optical drive unit 1406. The disk drive unit 1406 may include a computer-readable medium 1418 in which one or more sets of instructions 1414, e.g. software, can be embedded. Further, the instructions 1414 may embody one or more of the methods or logic as described. In a particular example, the instructions 1414 may reside completely, or at least partially, within the memory 1404 or within the processor 1402 during execution by the computer system 1400.

The present disclosure contemplates a computer-readable medium that includes instructions 1414 or receives and executes instructions 1414 responsive to a propagated signal so that a device connected to a network 1426 can communicate voice, video, audio, images or any other data over the network 1426. Further, the instructions 1414 may be transmitted or received over the network 1416 via a communication port or interface 1420 or using a bus 1408. The communication port or interface 1420 may be a part of the processor 1402 or may be a separate component. The communication port 1420 may be created in software or may be a physical connection in hardware. The communication port 1420 may be configured to connect with a network 1416, external media, the display 1410, or any other components in computing system 1400, or combinations thereof. The connection with the network 1416 may be established wirelessly as discussed later. Likewise, the additional connections with other components of the system 1400 may be established wirelessly. The network 1416 may alternatively be directly connected to the bus 1408.

The network 1416 may include wireless networks, Ethernet AVB networks, or combinations thereof. The wireless network may be a cellular telephone network, an 802.11, 802.16, 802.20, 802.1Q or WiMax network. Further, the network 1416 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, HTTP) may be used.

The present subject matter enables optical-systems, such as microscope, to enable an automatic focusing upon the objects lying away from the focal plane with and ease of operation. More specifically, the present subject matter facilitates the optical systems to enable detection of a type of distance-variation required in terms of the object for focusing, irrespective of the quality of object-image as formed. Moreover, a range of the working distance over which the optical-apparatus may be used for autofocusing of the image is large.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

We claim:

1. A method of focusing of an optical imaging apparatus, the method comprising:

causing illumination of an object using an off-axis illuminating beam to thereby cause generation of a scattered beam;

deriving a first set of luminous parameters from a first detected position of a luminous-representation formed by the scattered beam from the object, wherein the first set of luminous parameters correspond to a ratio of (A−B) and (A+B) with respect to the first detected position of the luminous representation, wherein A is instantaneous power of the scattered beam detected by one half of an array detector arranged to render the luminous representation based on the scattered beam, and B is instantaneous power of the scattered beam detected by the other half of the array detector; and focusing the illumination beam upon the object by triggering movement of the object along an optical axis in a direction, the direction being based on a numerical representation of the first set of luminous parameters.

2. The method of claim 1, further comprising:

deriving a second set of luminous parameters from a second detected position of the luminous representation of the object, the second detected position being related to the first detected position and the movement of the object; and adjusting the focusing of the illumination beam based on a second numerical representation of the second set of luminous parameters.

3. The method of claim 1, wherein adjusting the focusing includes ceasing the focusing of the illumination beam.

4. The method of claim 1, further comprising:

monitoring an intensity difference between adjacent pixels of an image formed at an array-detector based on projection of a subsequent-scatter beam that corresponds to illumination of the object using a diffused beam; and adjusting a focal length of the optical imaging apparatus based on the intensity difference.

5. The method of claim 4, further comprising adjusting the focal length based on the intensity difference until the intensity difference increases by a pre-determined threshold.

6. The method of claim 1, wherein the numerical representation for the first set of luminous parameters corresponds to a unique arithmetic sign associated with respect to a corresponding numeric value.

7. The method of claim 6, wherein the arithmetic sign is awarded to the respective numeric value in reference to a coordinate-system associated with the array detector.

8. A system comprising:

one or more processors; and one or more computer readable storage media having instructions stored thereon that, in response to being executed by the one or more processors, cause the system to perform operations, the operations comprising:

deriving a first set of luminous parameters from a first detected position of a luminous representation formed by a scattered beam from illumination of an object by an illumination beam;

focusing the illumination beam upon the object by triggering movement of the object with respect to an optical-axis in a first direction, the first direction being based on a first numerical-representation of the first set of luminous parameters;

focusing the illumination beam upon the object by triggering movement of the object along an optical axis in a direction, the direction being based on a numerical representation of the first set of luminous parameters;

monitoring an intensity difference between adjacent pixels of an image formed at an array-detector based on projection of a subsequent-scatter beam that corresponds to illumination of the object using a diffused beam; and further adjusting the focusing by adjusting a focal length of the system based on the intensity difference.

9. The system of claim 8, wherein adjusting the focusing includes ceasing the focusing of the illumination beam.

10. The system of claim 8, the operations further comprising adjusting the focal length based on the intensity difference until the intensity difference increases by a pre-determined threshold.

11. The system of claim 8, wherein the first of luminous parameters correspond to at least one of:

a ratio of (A−B) and (A+B) with respect to the first detected position of the luminous representation, wherein A is instantaneous power of the scattered beam detected by one half of an array detector arranged to render the luminous representation based on the scattered beam, and B is instantaneous power of the scattered beam detected by the other half of the array detector; and coordinates of a center of mass of the scattered beam received by the array detector arranged to render the luminous representation based on the scattered beam.

12. The system of claim 8, wherein the numerical representation for each of the first set of luminous parameters corresponds to a unique arithmetic sign associated with respect to a corresponding numeric value.

13. The system of claim 12, wherein the arithmetic sign is awarded to the respective numeric value in reference to a coordinate-system associated with an array detector.

14. One or more non-transitory computer readable storage media having instructions stored thereon that, in response to being executed by one or more processors, cause a system to perform operations, the operations comprising:

causing illumination of an object using an off-axis illuminating beam to thereby cause generation of a scattered beam;

deriving a first set of luminous parameters from a first detected position of a luminous-representation formed by the scattered beam from the object, wherein the first set of luminous parameters correspond to coordinates of a center of mass of the scattered beam received by an array detector arranged to render the luminous representation based on the scattered beam, wherein the coordinates represent positions of the center of mass within the array detector; and focusing the illumination beam upon the object by triggering movement of the object along an optical axis in a direction, the direction being based on a numerical representation of the first set of luminous parameters.

15. The one or more non-transitory computer readable storage media of claim 14, the operations further comprising:

deriving a second set of luminous parameters from a second detected position of the luminous representation of the object, the second detected position being related to the first detected position and the movement of the object; and adjusting the focusing of the illumination beam based on a second numerical representation of the second set of luminous parameters.

16. The one or more non-transitory computer readable storage media of claim 14, the operations further comprising:

monitoring an intensity difference between adjacent pixels of an image formed at an array-detector based on projection of a subsequent-scatter beam that corresponds to illumination of the object using a diffused beam; and adjusting a focal length of the system based on the intensity difference.

17. The one or more non-transitory computer readable storage media of claim 16, the operations further comprising adjusting the focal length based on the intensity difference until the intensity difference increases by a pre-determined threshold.

18. The one or more non-transitory computer readable storage media of claim 14, wherein the first of luminous parameters correspond to a ratio of (A−B) and (A+B) with respect to the first a detected position of the luminous representation, wherein A is instantaneous power of the scattered beam detected by one half of an array detector arranged to render the luminous representation based on the scattered beam, and B is instantaneous power of the scattered beam detected by the other half of the array detector.

19. The one or more non-transitory computer readable storage media of claim 14, wherein the first of luminous parameters correspond to coordinates of a center of mass of the scattered beam received by the array detector arranged to render the luminous representation based on the scattered beam.

20. The one or more non-transitory computer readable storage media of claim 14, wherein the numerical representation for the first set of luminous parameters corresponds to a unique arithmetic sign associated with respect to a corresponding numeric value.

* * * * *